United States Patent
Koo

(10) Patent No.: US 6,684,338 B1
(45) Date of Patent: Jan. 27, 2004

(54) APPARATUS AND METHOD FOR POWER MANAGEMENT OF COMPUTER SYSTEM

(75) Inventor: Ja-Goun Koo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 587 days.

(21) Appl. No.: 09/657,806

(22) Filed: Sep. 8, 2000

(30) Foreign Application Priority Data

Sep. 10, 1999 (KR) .......................................... 1999-38664

(51) Int. Cl.⁷ ................................................ G06F 1/32
(52) U.S. Cl. ...................................... 713/300; 713/320
(58) Field of Search .............................. 713/300, 320, 713/322, 323, 324

(56) References Cited

U.S. PATENT DOCUMENTS

| | | |
|---|---|---|
| 5,428,790 A | 6/1995 | Harper et al. |
| 5,530,879 A | 6/1996 | Crump et al. |
| 5,617,572 A | 4/1997 | Pearce et al. |
| 5,630,142 A | 5/1997 | Crump et al. |
| 5,638,541 A | 6/1997 | Sadashivaiah |
| 5,710,929 A | 1/1998 | Fung |
| 5,758,172 A | 5/1998 | Seo |
| 5,838,982 A | 11/1998 | Cooper et al. |
| 5,862,394 A | 1/1999 | Watts et al. |
| 5,870,613 A | 2/1999 | White et al. |
| 5,905,914 A * | 5/1999 | Sakai et al. ................... 710/67 |
| 5,925,134 A | 7/1999 | Solomon |
| 5,978,923 A | 11/1999 | Kou |
| 5,987,613 A | 11/1999 | Busch et al. |
| 6,006,335 A | 12/1999 | Choi et al. |
| 6,065,121 A | 5/2000 | Hobson et al. |
| 6,112,164 A | 8/2000 | Hobson |
| 6,369,466 B1 * | 4/2002 | Murphy ...................... 307/125 |
| 6,405,320 B1 * | 6/2002 | Lee et al. ................... 713/300 |
| 6,446,213 B1 * | 9/2002 | Yamaki ...................... 713/300 |
| 6,523,122 B1 * | 2/2003 | Moon ......................... 713/300 |

* cited by examiner

Primary Examiner—Dennis M. Butler
(74) Attorney, Agent, or Firm—Robert E. Bushnell, Esq.

(57) ABSTRACT

A computer system according to the present invention, comprises a light emitting diode (LED) indicating unit for indicating a power management system (PMS) state such as an Advanced Power Management (APM) mode and an Advanced Configuration and Power Interface mode, and a microcomputer for controlling the indicate unit in response to the power management system (PMS) state. Since the light emitting diode (LED) indicating unit indicates the power management system (PMS) state in a power saving mode as well as a normal mode of the computer system, a user can identify the power management system (PMS) state of the computer system correctly.

19 Claims, 11 Drawing Sheets

APPARATUS AND METHOD FOR POWER MANAGEMENT OF COMPUTER SYSTEM

CLAIM OF PRIORITY

This application makes reference to, incorporates the same herein, and claims all benefits accruing under 35 U.S.C. §119 from an application entitled APPARATUS AND METHOD FOR POWER MANAGEMENT OF COMPUTER SYSTEM earlier filed in the Korean Industrial Property Office on the 10th day of September 1999, and there duly assigned Ser. No. 38664/1999, a copy of which is annexed hereto.

BACKGROUND OF THE INVENTION

1. Technical Field

The present invention relates to an apparatus and method for power management in a computer, and more particularly to an apparatus and method for indicating power management system (PMS) setting state in a computer system.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a personal computer, a portable computer such as a notebook computer or palmsized computer, or other type of computer.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes is control of the computer system and its components. The first duty of the basic input output system is to perform a series of diagnostic routines called the power on self test (POST) routine, which ensures that every part of the computer system's hardware is functioning properly.

The Advanced Power Management (APM) specification provides an industry standard for system-wide power management of computers. Drafted by Intel and Microsoft, the standard is operating system-independent. System-wide power management under Advanced Power Management (APM) is accomplished through a cooperative connection between code in the basic input-output system (BIOS) and an operating system driver that enables the operating system to response to Advanced Power Management (APM) events.

Recently, the Advanced Configuration and Power Interface (ACPI) has been jointly proposed by Intel Corporation of Santa Clara, Calif., USA, Microsoft Corporation of Redmond, Wash., USA, and Toshiba Corporation of Tokyo, Japan. The Advanced Configuration and Power Interface (ACPI) is a new advanced power management standard. According to the Advanced Configuration and Power Interface specification, the operating system rather than the basic input-output system (BIOS) controls power management, thermal state, and plug-and-play functionality (wherein enumeration and configuration of motherboard devices is performed by the operating system) of the computer.

I have found that there is a need to enhance power management systems for computers. Efforts have been made to provide improved systems related to power management.

Exemplars of recent efforts include U.S. Pat. No. 5,428,790 for COMPUTER POWER MANAGEMENT SYSTEM issued to Harper et al., U.S. Pat. No. 5,710,929 for MULTI-STATE POWER MANAGEMENT FOR COMPUTER SYSTEMS issued to Fung, U.S. Pat. No. 5,617,572 for SYSTEM FOR REDUCING POWER CONSUMPTION IN COMPUTERS issued to Pearce et al., U.S. Pat. No. 5,862,394 for ELECTRONIC APPARATUS HAVING A SOFTWARE CONTROLLED POWER Switch issued to Watts et al., U.S. Pat. No. 5,987,613 for PORTABLE COMPUTER WITH TIME-SENSITIVE TRI-MODAL POWER MANAGEMENT SWITCH issued to Busch et al., U.S. Pat. No. 5,978,923 for METHOD AND APPARATUS FOR A COMPUTER POWER MANAGEMENT FUNCTION INCLUDING SELECTIVE SLEEP STATES issued to Kou, U.S. Pat. No. 5,530,879 for COMPUTER SYSTEM HAVING POWER MANAGEMENT PROCESSOR FOR SWITCHING POWER SUPPLY FROM ONE STATE TO ANOTHER RESPONSIVE TO A CLOSURE OF A SWITCH, A DETECTED RING OR AN EXPIRATION OF A TIMER issued to Crump et al., U.S. Pat. No. 5,630,142 for MULTIFUNCTION POWER SWITCH AND FEEDBACK LED FOR SUSPEND SYSTEMS issued to Crump et al., U.S. Pat. No. 6,112,164 for COMPUTER SYSTEM THERMAL MANAGEMENT issued to Hobson, U.S. Pat. No. 5,870,613 for POWER MANAGEMENT SYSTEM FOR A COMPUTER issued to White et al., U.S. Pat. No. 5,838,982 for POWER SWITCH METHOD AND APPARATUS FOR PREVENTING A FAILURE IN THE POWER CONTROLLER issued to Cooper et al., U.S. Pat. No. 6,006,335 for POWER MANAGEMENT SYSTEM AND METHOD OF DISPLAYING POWER MANAGEMENT INFORMATION IN A COMPUTER issued to Choi et al., U.S. Pat. No. 5,638,541 for SYSTEM AND METHOD FOR MANAGING POWER ON DESKTOP SYSTEMS issued to Sadashivaiah, U.S. Pat. No. 5,758,172 for APPARATUS AND METHOD FOR DISPLAYING PMS INFORMATION IN A PORTABLE COMPUTER issued to Seo, U.S. Pat. No. 5,925,134 for METHOD AND APPARATUS FOR POWER Management issued to Solomon, and U.S. Pat. No. 6,065,121 for CONTROL OF COMPUTER SYSTEM WAKE/SLEEP TRANSITIONS issued to Hobson et al.

While these recent efforts provide advantages, I note that they fail to adequately provide an apparatus and method for efficiently and conveniently controlling and facilitating power management of a computer system.

SUMMARY OF THE INVENTION

It is an object of the present invention to provide an apparatus for indicating a power management system (PMS) state in a computer system.

It is a further object of the present invention to provide a method for indicating a power management system (PMS) state in a computer system.

To achieve these objects and others, according to an aspect of the present invention, there is provided a computer system comprising a basic input-output system (BIOS) memory for storing a power management system (PMS) setting routine, a storage unit for storing a power management system state set by the routine stored in the basic input-output system memory, a light emitting diode (LED) indicator unit for indicating the power management system state, a power switch for generating a switching signal, a microcontroller for controlling the indicate unit in response to the power management system state stored in the storage unit, and for implementing power management functions in response to the switching signal. The storage unit can be a power management system (PMS) state storage unit.

To achieve these objects and others, according to another aspect of the present invention, there is provided a power management method of a computer system having a complementary metal oxide semiconductor (CMOS) memory for storing a power management system state and an indicate unit for indicating the power management system state of the computer system, the method comprises the steps of: detecting the power management system state of the computer system; indicating the power management system state of the computer system through the indicate unit; determining whether a switching signal is inputted or not through a power switch; and executing power management operation corresponding to the power management system state, in response to the switching signal.

To achieve these and other objects in accordance with the principles of the present invention, as embodied and broadly described, the present invention provides a computer apparatus, comprising: a basic input-output system memory for storing a routine for setting a power management system state; a complementary metal oxide semiconductor memory for storing said power management system state set by said routine stored in said basic input-output system memory; an indicating unit for indicating said power management system state; a power switch for generating a switching signal; and a microcomputer for controlling said indicating unit in response to said power management system state stored in said complementary metal oxide semiconductor memory, and for implementing power management functions in response to said switching signal.

To achieve these and other objects in accordance with the principles of the present invention, as embodied and broadly described, the present invention provides a method, comprising: a power management method of a computer system having a complementary metal oxide semiconductor memory for storing a power management system state and having an indicating unit for indicating said power management system state of said computer system, the power management method comprising: detecting said power management system state of said computer system; indicating said power management system state of said computer system through said indicating unit; determining whether a switching signal is generated through a power switch; and executing power management operation corresponding to said power management system state, in response to said switching signal.

To achieve these and other objects in accordance with the principles of the present invention, as embodied and broadly described, the present invention provides a method, comprising: detecting a power state of a computer; indicating said power state of said computer with an indicating unit;

determining when a switching signal is generated through a power switch; and executing a power management operation corresponding to said power state, in response to said switching signal.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

A user sets a power management system (PMS) state to the advanced configuration and power interface (ACPI) mode or the Advanced Power Management (APM) mode in a complementary metal oxide semiconductor (CMOS) setup of the computer system. The Advanced Configuration and Power Interface specification has more complex power management modes compare to the Advanced Power Management (APM) specification.

Figure 1:
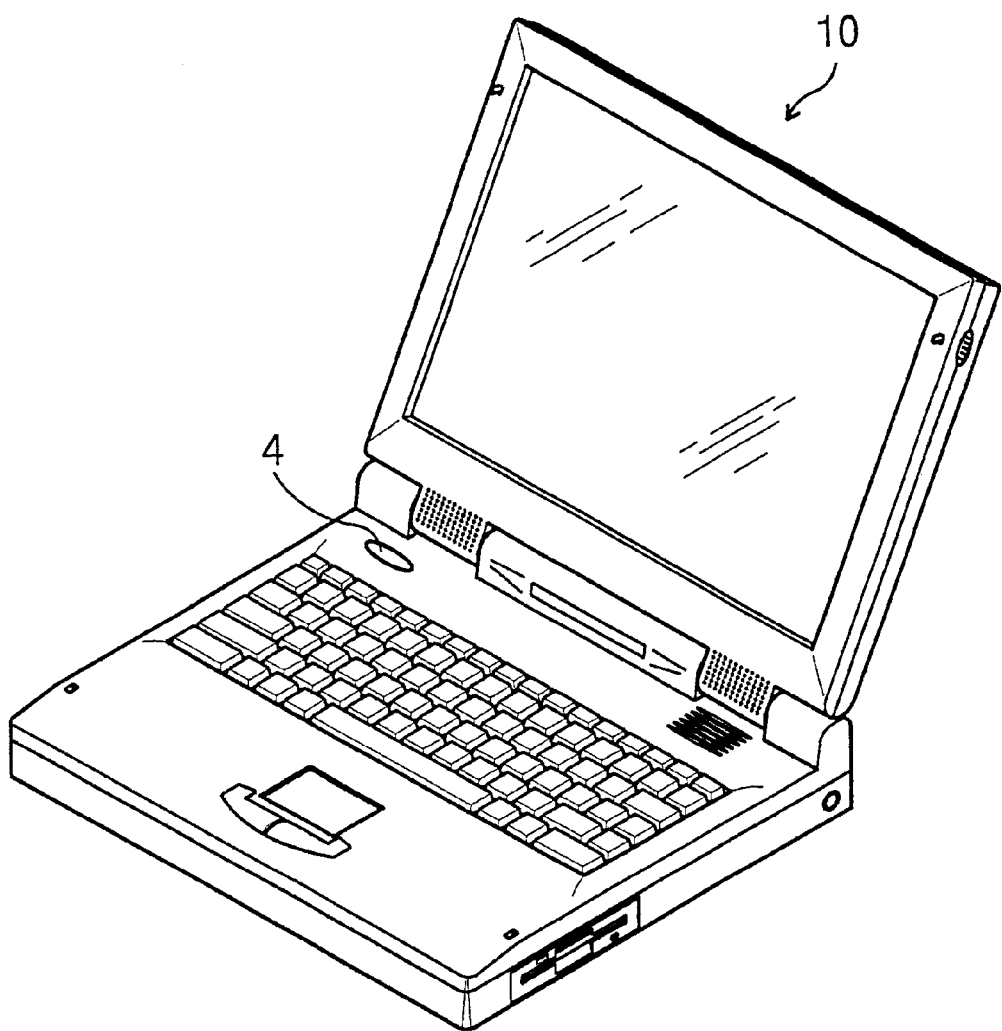
FIG. 1 is a perspective view for illustrating a portable computer system.
Figure 2:
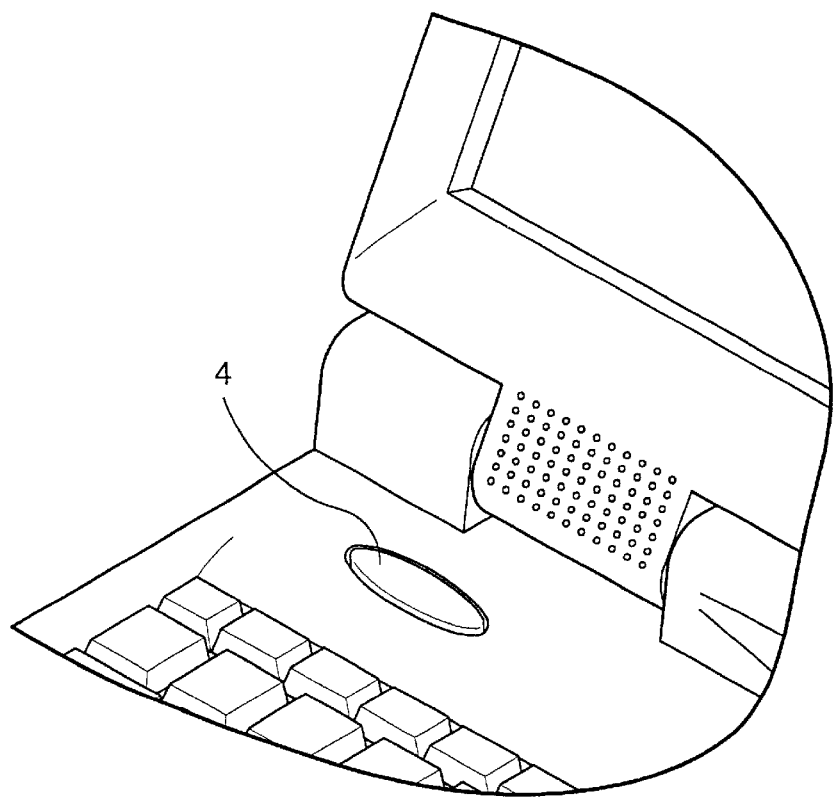
FIG. 2 is a diagram for illustrating a power switch of the portable computer system of FIG. 1.
Figure 3:
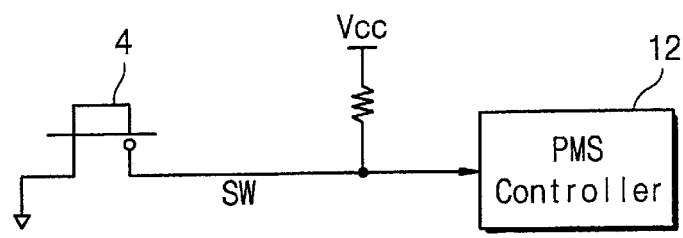
FIG. 3 is a circuit diagram for illustrating a relationship between the power switch of FIG. 2 and a power management system controller.

FIG. 1 is a perspective view for illustrating a portable computer system. FIG. 2 is a diagram for illustrating a power switch of the portable computer system of FIG. 1. FIG. 3 is a circuit diagram for illustrating a relationship between the power switch of FIG. 2 and a power management system controller.

FIG. 1 is a perspective view for illustrating a portable computer system 10. FIG. 2 is a diagram for illustrating a power switch 4 of the portable computer system 10 of FIG. 1. FIG. 3 is a circuit diagram for illustrating a relationship between the power switch 4 of FIG. 2 and a power management system controller 12.

Referring to FIGS. 1 and 2, the computer system 10 comprises a power switch 4. Referring to FIG. 3, the power switch 4 is coupled to a power management system(PMS) controller 12. When the power switch 4 is pressed down, the power switch 4 generates a switching signal SW to the power management system controller 12. The power management system controller 12 generates a power control signal into a power supply unit (not shown) in response to the switching signal SW, so as to control the power state of the computer system. Thus, the power supply unit (not shown) supplies the power to the computer system in response to the power control signal, so that the power state of the computer system 10 can be controlled by the power management system controller 12.

Figure 4:
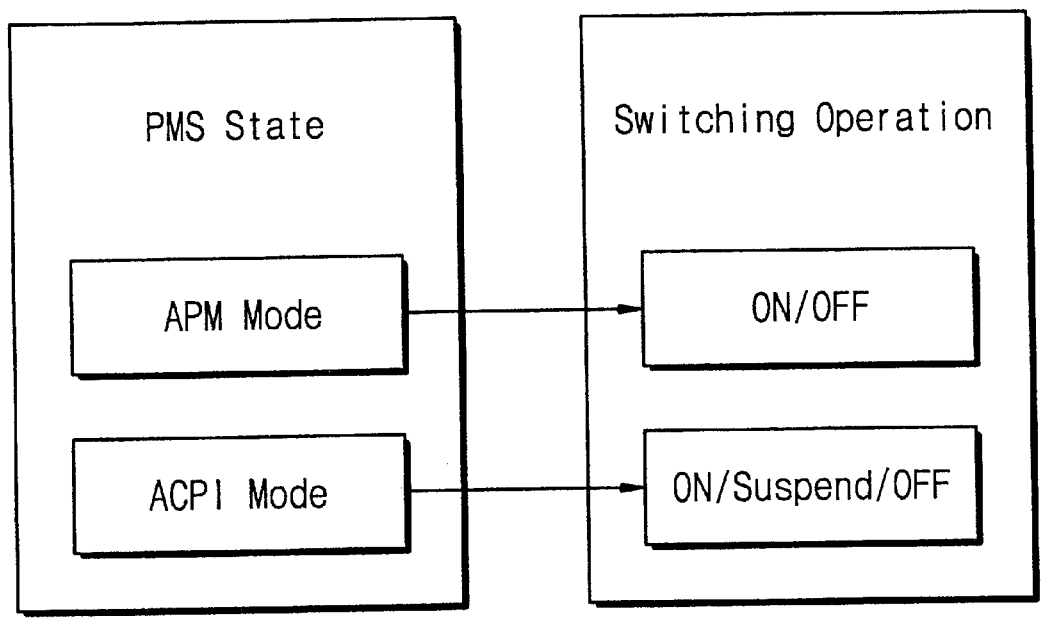
FIG. 4 is a block diagram for illustrating operation of the power switch of FIG. 3 in accordance with the power management system state.

FIG. 4 is a block diagram for illustrating operation of the power switch of FIG. 3 in accordance with the power management system state. FIG. 4 illustrates operation of the power switch 4 of FIG. 3 in accordance with the power management system state. Referring to FIG. 4, the power switch 4 executes power ON/OFF operation in the Advanced Power Management (APM) mode, and executes power ON/Suspend/OFF operation in the Advanced Configuration and Power Interface mode.

It In the Advanced Power Management (APM) mode, the switching signal SW is generated so as to control the power ON/OFF operation of the computer system 10. For example, when the power switch 4 is pressed down in a power off state, the power management system controller 12 generates a power control signal to the power supply unit (not shown) for turning on the power of the computer system 10 in response to the switching signal SW. On the contrary, when the power switch 4 is pressed down in a power on state (e.g., normal mode) or a low power state (e.g., standby or suspend mode), the power management system controller 12 generates a power control signal to the power supply unit (not shown) for turning off the power of computer system 10 in response to the switching signal SW.

In the Advanced Configuration and Power Interface mode, the switching signal SW is generated so as to control the power ON/Suspend/OFF operation of the computer system 10. For example, when the power switch 4 is pressed down in a power off state or a low power state (e.g., standby or suspend mode), the power management system controller 12 generates a power control signal to the power supply unit (not shown) for entering a power on state (e.g., normal mode) of the computer system 10 in response to the switching signal SW. On the contrary, when the power switch 4 is pressed down in a power on state, the power management system controller 12 generates a power control signal to the power supply unit (not shown) for saving the power in response to the switching signal SW. In that case, the power supply unit (not shown) supplies lower power to the computer system 10 without turning off the power. If the power switch is pressed down more than 4 seconds, the computer system 10 is turned off in response to the switching signal SW.

As described above, the power switch 4 executes different operations in accordance with the power management system state. Since the computer system of FIG. 1 does not indicate the power management system state, it is possible that a user can make a mistake. For example, in the power saving mode of the Advanced Power Management, if user presses down the power switch 4 for returning the normal mode just as the Advanced Configuration and Power Interface, the computer system 10 is powered off without data storing. Thus, undesirable data loss and serious damage can occur to the computer system 10. Therefore, apparatus and method are demanded for indicating a power management system state so as to prevent these problems.

Figure 5:
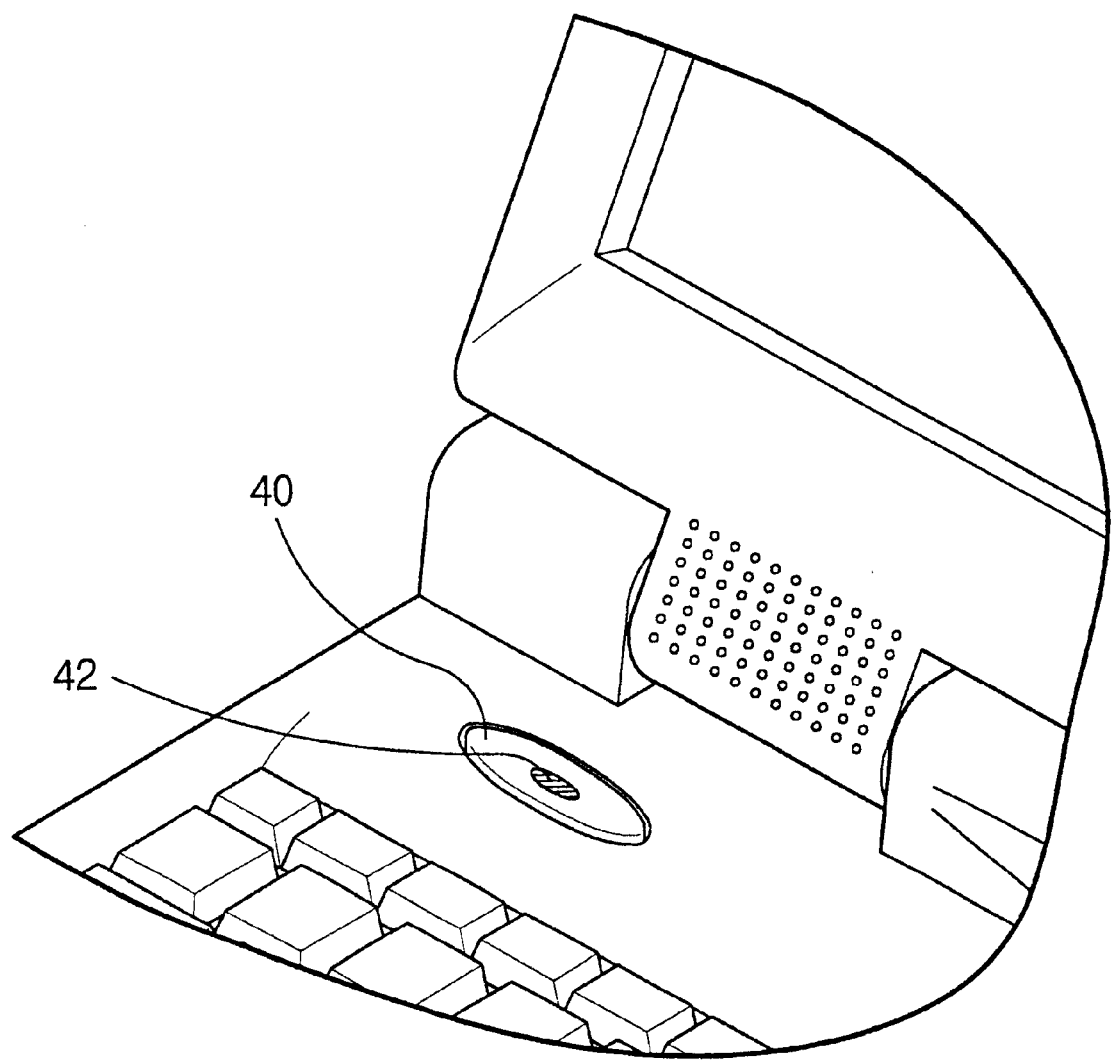
FIG. 5 is a diagram for illustrating a preferred embodiment of a power switch to indicate power management system state, in accordance with the principles of the present invention.

FIG. 5 is a diagram for illustrating a preferred embodiment of a power switch to indicate power management system state, in accordance with the principles of the present invention. FIG. 5 is a diagram for illustrating a preferred embodiment of a power switch 40 to indicate a power management system state according to the present invention. Referring to FIG. 5, the power switch 40 includes a light emitting diode (LED) 42. For example, if the power management system state of the computer system is an Advanced Configuration and Power Interface mode, the light emitting diode 42 is lit, and if the power management system state of the computer system is an Advanced Power Management mode, the light emitting diode 42 is not lit. Thus, a user can identify the power management system state of the computer system through the light emitting diode 42. If the light emitting diode 42 is a multicolor unit able to be lit to more than two colors, the light emitting diode 42 can indicate the Advanced Configuration and Power Interface (ACPI) mode and the Advanced Power Management (APM) mode, respectively, by changing color. Therefore, user can recognize the power management system state of the computer system through the light emitting diode 42. A multicolor unit can be any unit capable of displaying at least two colors.

Figure 6:
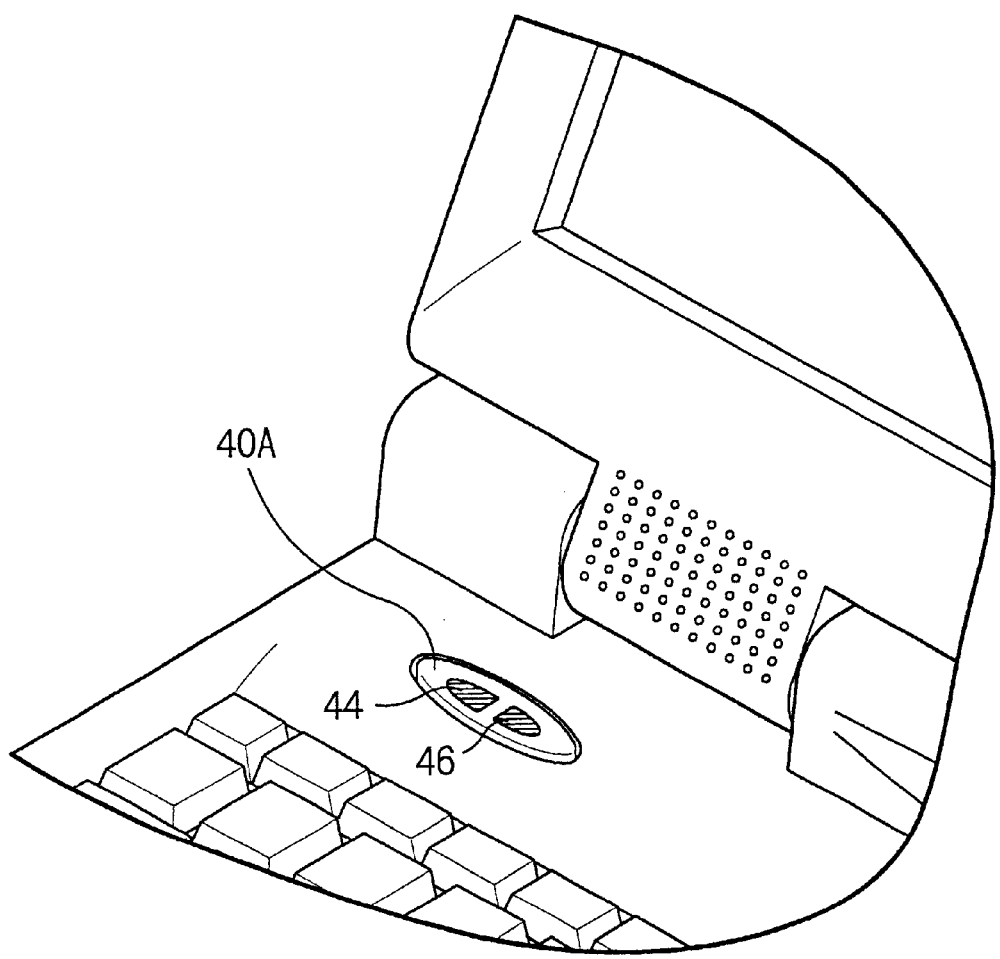
FIG. 6 is a diagram for illustrating another preferred embodiment of a power switch to indicate power management system state, in accordance with the principles of the present invention.

FIG. 6 is a diagram for illustrating another preferred embodiment of a power switch to indicate power management system state, in accordance with the principles of the present invention. FIG. 6 is a diagram for illustrating another preferred embodiment of a power switch 40A to indicate a power management system state according to the present invention. Referring to FIG. 6, the power switch 40A includes two LEDs 44 and 46 and therefore switch 40A can be said to include a multiple-display unit. Each light emitting diode indicates respective power management system state such as the Advanced Configuration and Power Interface (ACPI) mode and the Advanced Power Management (APM) mode.

For example, if the left light emitting diode 44 indicates the Advanced Configuration and Power Interface (ACPI) mode and the right light emitting diode 46 indicates Advanced Power Management (APM) mode, characters "ACPI" and "APM" are able to be located on the LEDs, respectively, so as to easily verify the power management system state. Instead of the characters "ACPI" and "APM", characters "4" and "0" can be located on the LEDs, respectively.

Generally, in the Advanced Configuration and Power Interface (ACPI) mode, the power of the computer system is turned off after pressing down the power switch 40A more than 4 seconds. Thus, the character "4" means that the power of the computer system is turned off after pressing down the power switch 40A more than 4 seconds. In the Advanced Power Management (APM) mode, the power of the computer system is immediately turned off after pressing down the power switch 40A. Thus, the character "0" means that the power of the computer system is turned off, immediately, after pressing down the power switch 40A. Therefore, user can recognize the power management system state of the computer system by characters on the LEDs 44 and 46.

Figure 7:
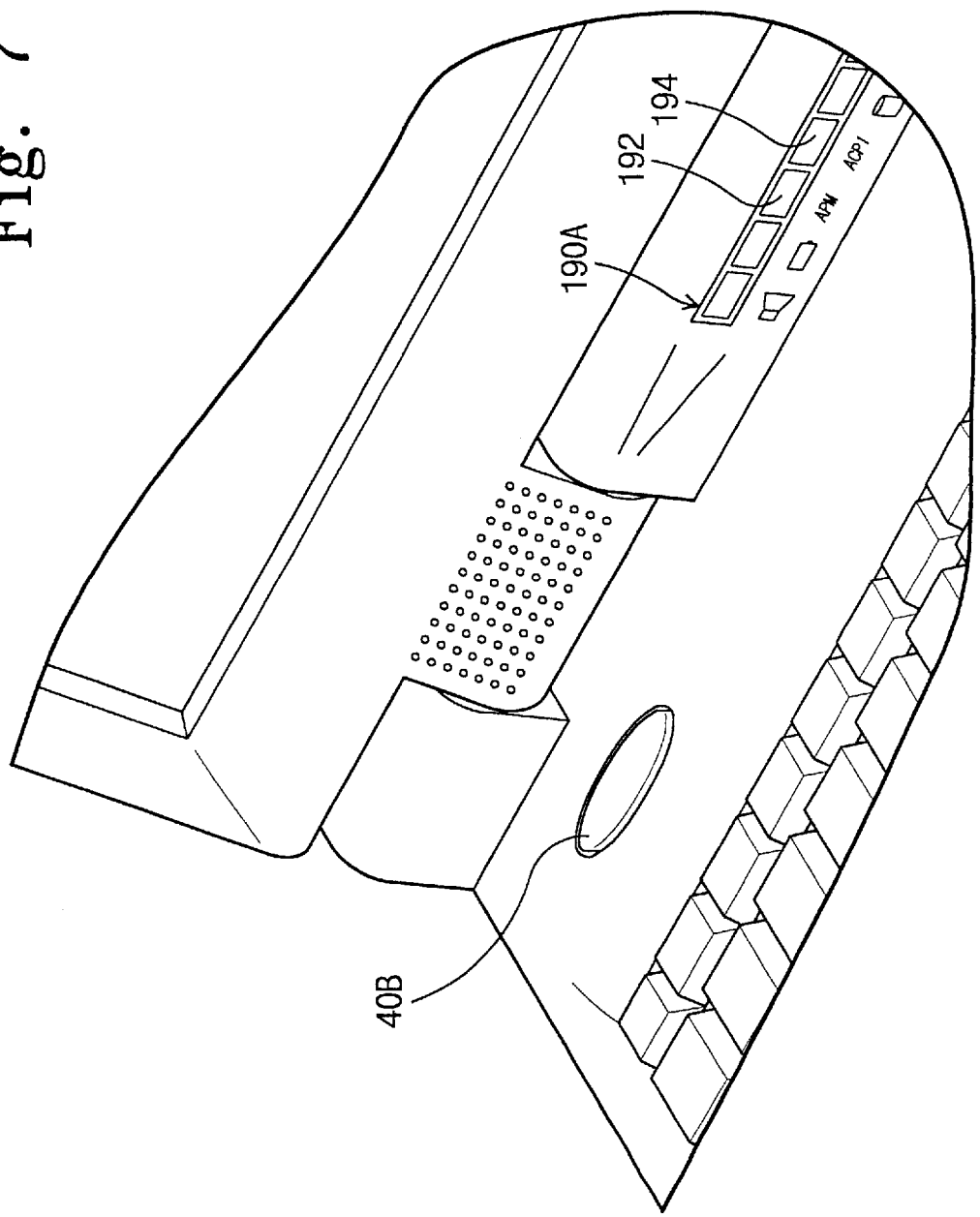
FIG. 7 is a diagram for illustrating a preferred embodiment of a light emitting diode indicate unit to indicate power management system state, in accordance with the principles of the present invention.

FIG. 7 is a diagram for illustrating a preferred embodiment of a light emitting diode indicate unit to indicate power management system state, in accordance with the principles of the present invention. FIG. 7 is a diagram for illustrating a preferred embodiment of a power management system state indicating LED unit 190A according to the present invention. Referring to FIG. 7, the computer system includes the power management system state indicating LED unit 190A having a plurality of light emitting diode indicators for indicating a power management system state, a power state, a hard disk operating state, a battery capacity, and so on. For indicating the power management system state, the light emitting diode unit 190A comprises an Advanced Power Management (APM) mode indicator 192 and an Advanced Configuration and Power Interface (ACPI) mode indicator 194.

As shown in FIG. 7, the Advanced Power Management (APM) mode indicator 192 and the Advanced Configuration and Power Interface (ACPI) mode indicator 194 indicate the power management system state, respectively. Thus, user can recognize the power management system state of the computer system, correctly, by the indicators 192 and 194.

Figure 8:
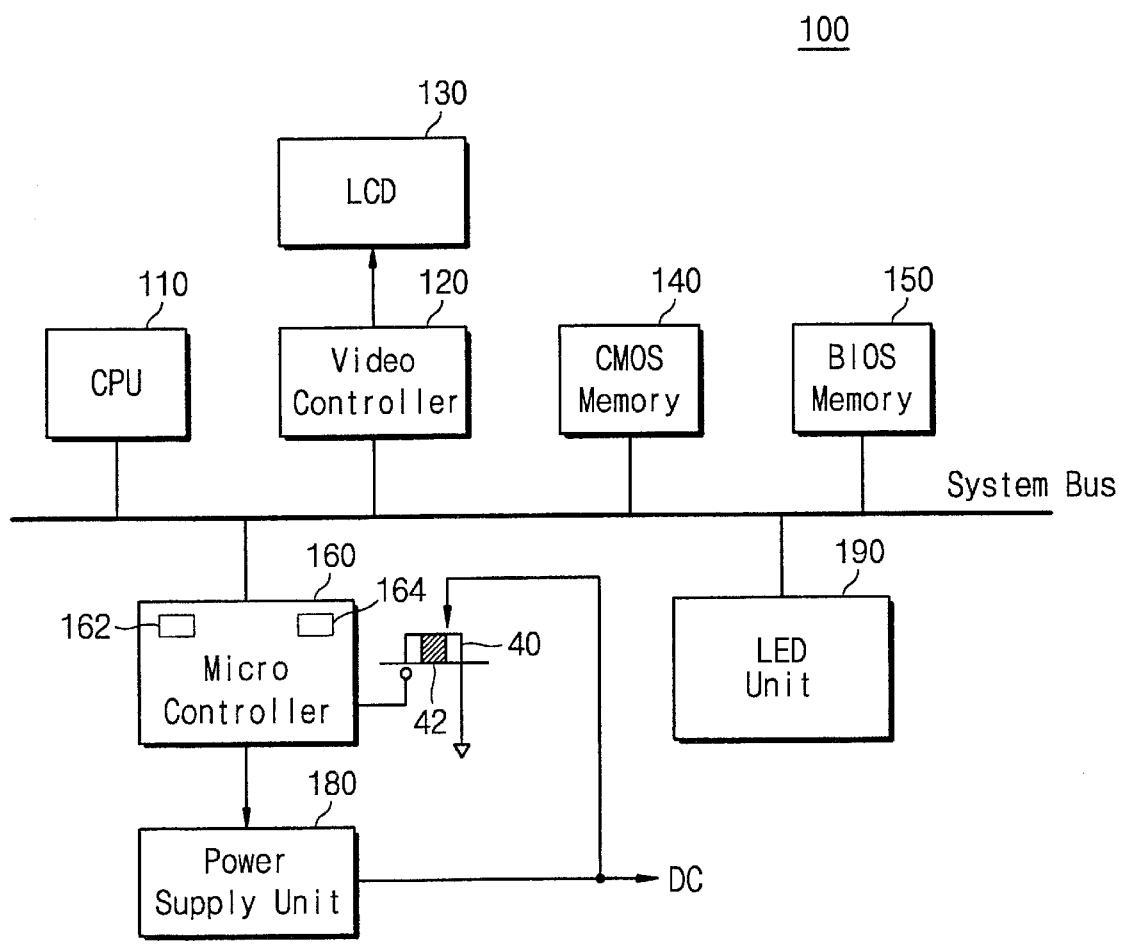
FIG. 8 is a block diagram for illustrating a preferred embodiment of a computer system, in accordance with the principles of the present invention.

FIG. 8 is a block diagram for illustrating a preferred embodiment of a computer system, in accordance with the principles of the present invention. FIG. 8 is a block diagram for illustrating a preferred embodiment of a computer system 100 according to the present invention. Referring to FIG. 8, the computer system 100 comprises a central processing unit (CPU) 110, a video controller 120, a liquid crystal display (LCD) 130, a complementary metal oxide semiconductor (CMOS) memory 140, a basic input/output system (BIOS) memory 150, a microcontroller 160, a power supply unit 180, a light emitting diode unit 190, and a power switch 40.

The basic input-output system (BIOS) memory 150 contains a routine for setting a power management system state. The power management system state is set in a complementary metal oxide semiconductor (CMOS) setup of the computer system 100. After the complementary metal oxide semiconductor (CMOS) setup, the power management system state is stored in the CMOS memory 140.

The microcontroller 160 contains a combined program for controlling power management system function of elements shown in FIGS. 1–3, and for controlling the power management system state indicating function in accordance with the principles of the present invention. The functions are classified into a power management system (PMS) control unit 162 and a control unit for indicating power management system state 164. The power management system control unit 162 executes power management operations corresponding to the power management system state for elements shown in FIGS. 1–3, and the control unit 164 controls the power management system state indicating functions in accordance with the principles of the present invention.

When the computer is powered on, the control unit for indicating power management system state 164 detects whether the power management system state of the computer system 100 is set to either the Advanced Configuration and Power Interface (ACPI) mode or the Advanced Power Management (APM) mode by the power management system state stored in the complementary metal oxide semiconductor (CMOS) memory 140. After detecting the power management system state, the control unit 164 controls the power supply unit 180 so as to supply the DC voltage to the light emitting diode 42 of the power switch 40. Thus, the power management system state of the computer system can be indicated by the light emitting diode 42, and user identifies the power management system state.

Figure 9:
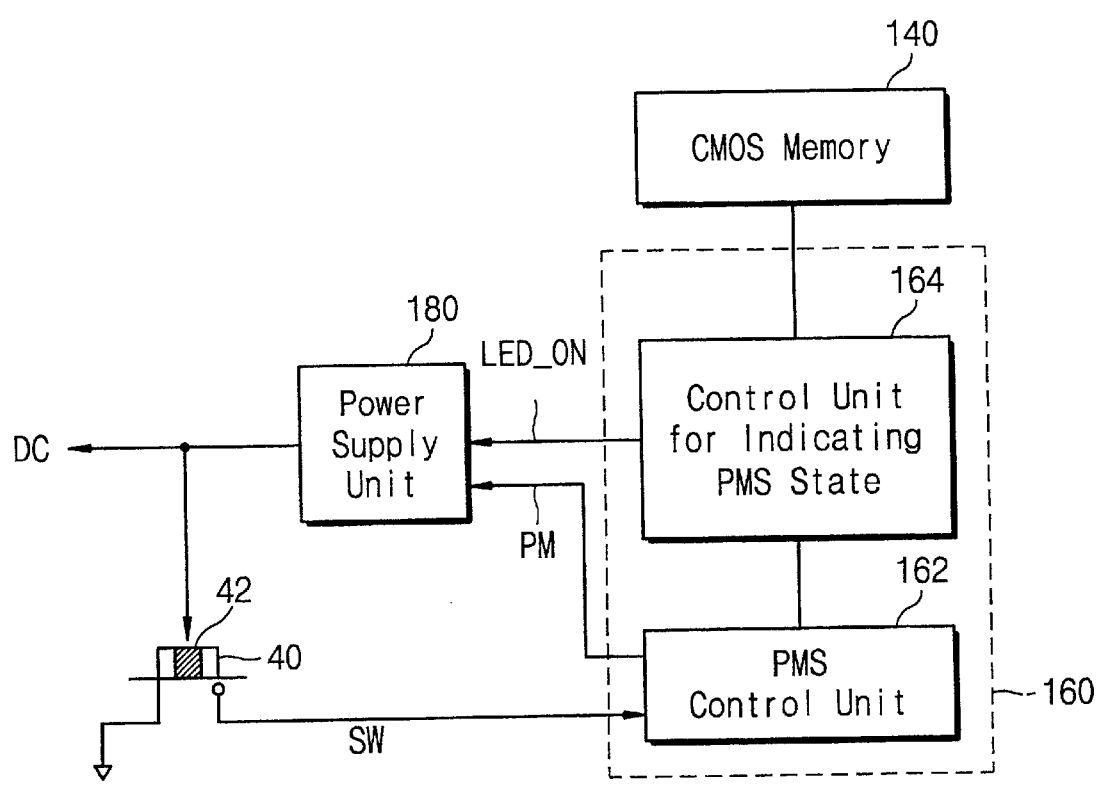
FIG. 9 is a block diagram for illustrating a connection between a microcontroller and the power switch of FIG. 8, in accordance with the principles of the present invention.

FIG. 9 is a block diagram for illustrating a connection between a microcontroller and the power switch of FIG. 8, in accordance with the principles of the present invention. FIG. 9 is a block diagram for illustrating a connection between the microcontroller 160 and a power switch 40 of FIG. 8. Referring to FIG. 9, the power management system control unit 162 generates a power control signal PM to the power supply unit 180. The power supply unit 180 supplies the DC voltage to the computer system in response to the power control signal PM.

The control unit for indicating power management system state 164 detects the power management system state of the computer by latching the power management system state stored in the complementary metal oxide semiconductor memory 140. The control unit for indicating power management system state 164 generates a control signal LED_ON to the power supply unit 180 for turning on the light emitting diode 42 corresponding to the power management system state. The power supply unit 180 supplies the DC voltage to the light emitting diode 42 so that the light emitting diode is turned on in response to the control signal LED_ON. Thus, user can identify whether the power management system state is set to the Advanced Configuration and Power Interface (ACPI) mode or the Advanced Power Management (APM) mode, correctly. Therefore, user can operate the power switch 40 properly, without an error.

For example, if the power management system state is set to the Advanced Configuration and Power Interface (ACPI) mode, the light emitting diode 42 is turned on under control of the control unit for indicating power management system state 164. The light emitting diode is continually turned on by the DC voltage from the power supply unit 180, so that user can identify the power management system state although the computer system 100 is in the power saving mode. Thus, undesirable data loss and serious damage can be prevented.

Figure 10:
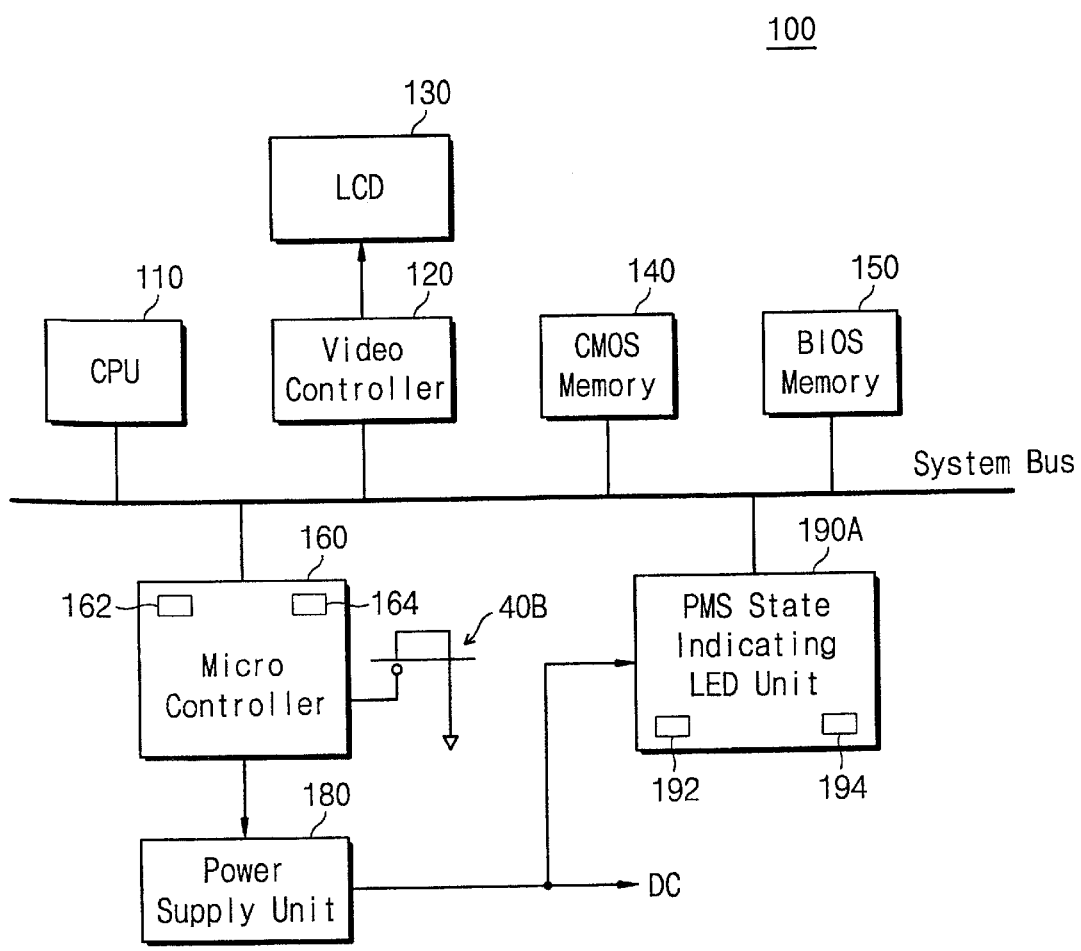
FIG. 10 is a block diagram for illustrating another preferred embodiment of a computer system, in accordance with the principles of the present invention.
Figure 11:
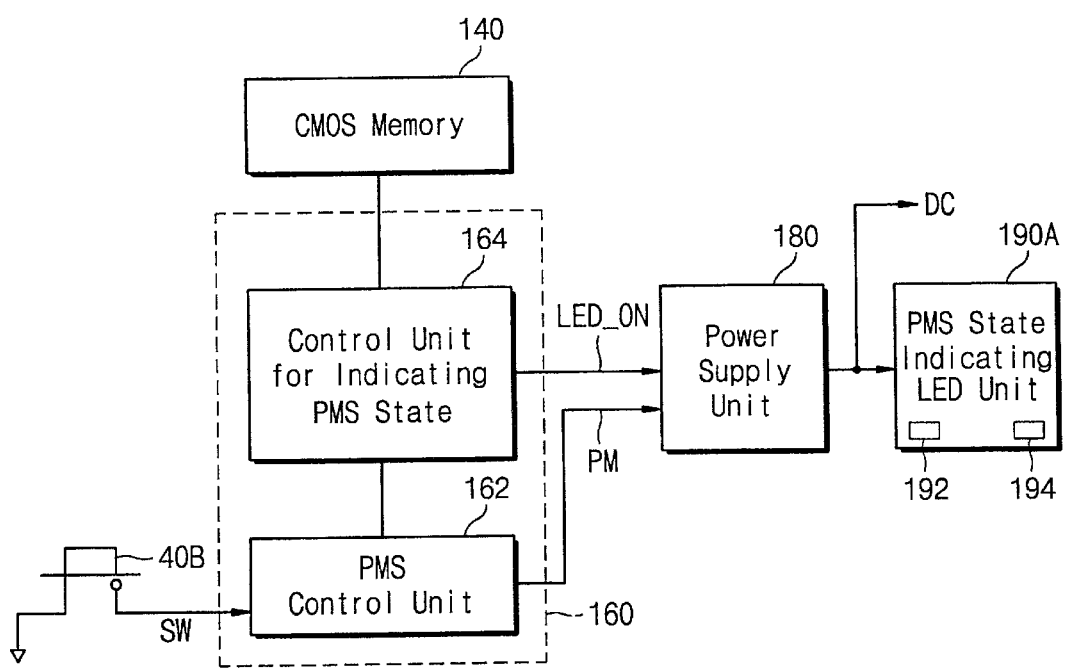
FIG. 11 is a block diagram for illustrating a connection between the microcontroller and the light emitting diode indicate unit of FIG. 10, in accordance with the principles of the present invention.

FIG. 10 is a block diagram for illustrating another preferred embodiment of a computer system, in accordance with the principles of the present invention. FIG. 11 is a block diagram for illustrating a connection between the microcontroller and the light emitting diode indicate unit of FIG. 10, in accordance with the principles of the present invention.

FIG. 10 is a block diagram for illustrating another preferred embodiment of a computer system 100 according to the present invention. FIG. 11 is a block diagram for illustrating a connection between the microcontroller 160 and the power management system state indicating LED unit 190A of FIG. 10. FIGS. 10 and 11, they have the same arrangement as that shown in FIGS. 8 and 9, respectively, with exception that the power supply unit 180 is coupled to the light emitting diode indicate unit 190A for supplying the DC voltage. In FIGS. 10 and 11, the same parts as those shown in FIGS. 8 and 9 are represented with like reference numerals and to avoid description duplication, accordingly, their explanation will be omitted.

As shown in FIG. 11, the power management system state indicating LED unit 190A includes the Advanced Power Management mode indicator 192 and the Advanced Configuration and Power Interface modes indicator 194. The control unit for indicating power management system state 164 detects the power management system state of the computer system 100 by latching the power management system state stored in the complementary metal oxide semiconductor memory 140. The control unit for indicating power management system state 164 generates a control signal LED_ON for turning on either the Advanced Power Management mode indicator 192 or the Advanced Configuration and Power Interface mode indicator 194 in response to the detected power management system state. For example, if the power management system state is set to the Advanced Power Management mode, the Advanced Power Management mode indicator 192 is turned on, and if the power management system state is set to the Advanced Configuration and Power Interface mode, the Advanced Configuration and Power Interface mode indicator 194 is turned on under control of the control unit for indicating power management system state 164.

The indicator 192 or 194 is continually turned on by the DC voltage from the power supply unit 180, so that user can identify the power management system state although the computer system 100 is in the power saving mode. Thus, undesirable data loss and serious damage can be prevented.

Figure 12:
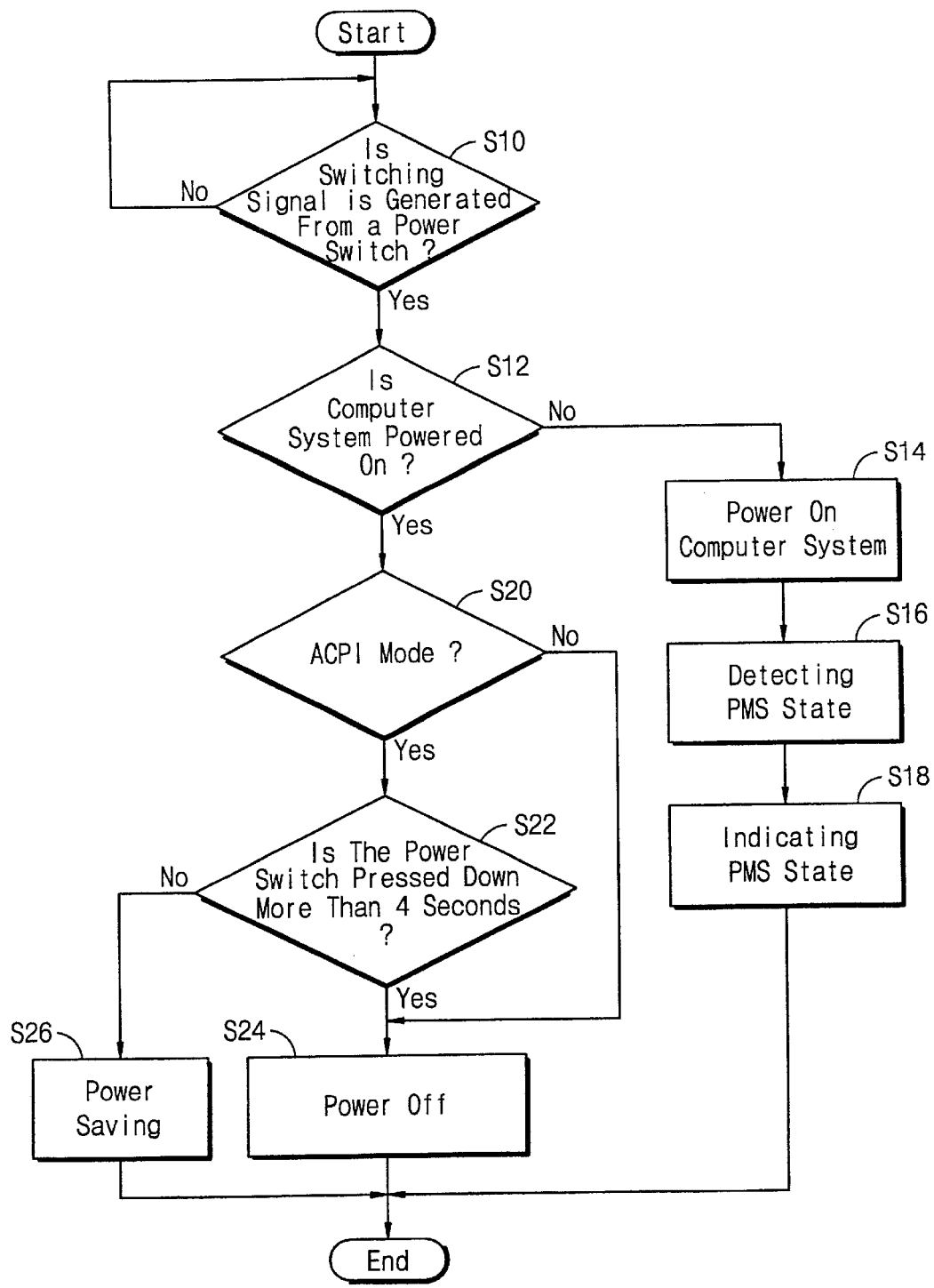
FIG. 12 is a flowchart for illustrating the operation of a novel power management program including a function for indicating power management system state of the computer system, in accordance with the principles of the present invention.

FIG. 12 is a flowchart for illustrating the operation of a novel power management program including a function for indicating power management system state of the computer system, in accordance with the principles of the present invention. FIG. 12 is a flowchart for illustrating the operation of a novel power management program including a function to indicate power management system state of the computer system. The power management program is stored in the microcomputer 160.

Referring to FIG. 12, at step S10, it is determined whether the switching signal SW is generated from the power switch 40. If so, the control flow proceeds to the next query step S12, wherein it is asked whether the computer system is in a power on state (e.g., normal mode) or not. If the computer system is not in the power on state, the control proceeds to step S14. At step S14, the computer system is powered on. In step S16, the control unit for indicating power management system state 164 of the microcontroller 160 detects the power management system state of the computer system by latching the power management system state stored in the complementary metal oxide semiconductor memory. Then at step S18, it indicates the power management system state through the light emitting diode 42 of FIG. 9 or the light emitting diode indicator 192 or 194 of FIG. 11.

At the step S12, if the computer system is in the power on state (e.g., normal mode), the control proceeds to step S20, wherein it is asked whether the power management system state of the computer system is the Advanced Configuration and Power Interface mode or not. If so, the control flows to the next query step S22. At step S22, it is asked whether the power switch is pressed down more than 4 seconds, so as to turn off the power of the computer system. If so, the power of the computer system is turned off in step S24. If not, the power of the computer system is suspended in step S26 so as to save the power. At step S20, if the power management system state of the computer system is not the Advanced Configuration and Power Interface mode, the power of the computer system is turned off in step S24.

As described above, the microcontroller 160 according to the present invention can indicate the power management system state through either the light emitting diode of the power switch 40, or the light emitting diode indicator 192 or 194 of the light emitting diode indicating unit 190A. Thus, user can identify the power management system state of the computer system, correctly. Therefore, undesirable data loss and serious damage can be prevented.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer apparatus, comprising:
   a basic input-output system memory for storing a routine for setting a power management system state;
   a power management system state storage unit for storing said power management system state set by said routine stored in said basic input-output system memory;
   an indicating unit for indicating said power management system state;
   a power switch for generating a switching signal; and
   microcontroller for controlling said indicating unit in response to said power management system state stored in said power management system state storage unit, and for implementing power management functions in response to said switching signal, said power management system state of said computer apparatus being set to one selected from among an Advanced Power Management mode and an Advanced Configuration and Power Interface mode.

2. The apparatus of claim 1, said indicating unit comprising at least one light emitting diode for indicating said power management system state.

3. The apparatus of claim 1, said indicating unit continually indicating said power management system state when said computer apparatus is in a power saving mode and when said computer apparatus is in a normal power mode.

4. The apparatus of claim 1, said microcontroller comprising a power management system control unit and a control unit for indicating said power management system state.

5. The apparatus of claim 4, said control unit for indicating said power management system state controlling said indicating unit to indicate said power management system state, by latching said power management system state stored in said power management system state storage unit in a booting operation of said computer apparatus.

6. A method, comprising:
   setting a power state of a computer to one mode selected from among an Advanced Power Management mode and an Advanced Configuration and Power Interface mode; detecting said power state of said computer;
   indicating said power state of said computer with an indicating unit;
   determining when a switching signal is generated through a power switch; and
   executing a power management operation corresponding to said power state, in response to said switching signal.

7. The method of claim 6, said executing of said power management operation comprising:

detecting a power supply state of said computer;

switching on power of said computer in response to said switching signal, when said switching signal is generated while power is not being supplied to said computer system;

switching off power of said computer in response to said switching signal, when said switching signal is generated while power is being supplied to said computer and said computer is in said Advanced Power Management mode;

switching off power of said computer in response to said switching signal, when said switching signal is generated while power is suspended and said computer is in said Advanced Power Management mode;

suspending power of said computer in response to said switching signal, when said switching signal is generated while power is being supplied to said computer and said computer is in said Advanced Configuration and Power Interface mode; and switching off power of said computer in response to said switching signal, when said switching signal is generated while power is being supplied to said computer system and said computer is in said Advanced Configuration and Power Interface mode and said power switch is pressed a predetermined plurality of occurrences, each occurrence for a predetermined quantity of time.

8. The method of claim 6, said executing of said power management operation comprising:

detecting a power supply state of said computer;

switching on power of said computer in response to said switching signal, when said switching signal is generated while power is not being supplied to said computer system;

switching off power of said computer in response to said switching signal, when said switching signal is generated while power is being supplied to said computer and said computer is in said Advanced Power Management mode;

switching off power of said computer in response to said switching signal, when said switching signal is generated while power is suspended and said computer is in said Advanced Power Management mode;

suspending power of said computer in response to said switching signal, when said switching signal is generated while power is being supplied to said computer and said computer is in said Advanced Configuration and Power Interface mode; and switching off power of said computer in response to said switching signal, when said switching signal is generated while power is being supplied to said computer system and said computer is in said Advanced Configuration and Power Interface mode and said power switch is pressed a predetermined number of times separated by predetermined intervals of time.

9. The method of claim 6, said executing of said power management operation comprising:

detecting a power supply state of said computer;

switching on power of said computer in response to said switching signal, when said switching signal is generated while power is not being supplied to said computer system;

switching off power of said computer in response to said switching signal, when said switching signal is generated while power is being supplied to said computer and said computer is in said Advanced Power Management mode;

switching off power of said computer in response to said switching signal, when said switching signal is generated while power is suspended and said computer is in said Advanced Power Management mode;

suspending power of said computer in response to said switching signal, when said switching signal is generated while power is being supplied to said computer and said computer is in said Advanced Configuration and Power Interface mode; and switching off power of said computer in response to said switching signal, when said switching signal is generated while power is being supplied to said computer system and said power switch is engaged for at least a predetermined quantity of time and said computer is in said Advanced Configuration and Power Interface mode.

10. The method of claim 9, said indicating unit comprising at least one light emitting diode for indicating said power state.

11. The method of claim 10, said indicating unit continually indicating said power state when said computer is in a power saving mode and when said computer is in a normal mode.

12. The method of claim 11, said detecting of said power state of said computer being performed by latching said power state stored in a memory in a booting operation of said computer.

13. The method of claim 12, said memory corresponding to a complementary metal oxide semiconductor memory.

14. A computer apparatus, comprising:

a power management system including at least one state selected from among a first power mode and a second power mode;

a basic input-output system memory for storing a routine for setting the at least one state of said power management system;

a PMS state storage unit for storing the state of said power management system; and an indicating unit for indicating the stored state of said power management system, said indicating unit corresponding to at least one selected from among a multi-color unit and a multiple-display unit.

15. The computer apparatus of claim 14, with the first power mode corresponding to Advanced Configuration and Power Interface mode, and with the second power mode corresponding to Advanced Power Management mode.

16. The computer apparatus of claim 15, when said indicating unit corresponds to the multiple-display unit, said indicating unit further comprising:

a first unit with a label selected from among "ACPI" and "4", said first unit emitting light when the state of said power management system corresponds to the Advanced Configuration and Power Interface mode; and a second unit with a label selected from among "APM" and "0", said second unit emitting light when the state of said power management system corresponds to the Advanced Power Management mode.

17. The computer apparatus of claim 14, when said indicating unit corresponds to the multicolor unit, said indicating unit displaying a first color when the state of said power management system corresponds to the first power mode, and said indicating unit displaying a second color when the state of said power management system corresponds to the second power mode.

18. The computer apparatus of claim 17, with the first power mode corresponding to Advanced Configuration and Power Interface mode, and with the second power mode corresponding to Advanced Power Management mode.

19. The computer apparatus of claim 18, with the first color corresponding to a label selected from among "ACPI" and "4", and with the second color corresponding to a label selected from among "APM" and "0".

* * * * *